(No Model.)
R. & C. McALPINE.
SAW FOR PLUMBERS' USE.
No. 407,941. Patented July 30, 1889.
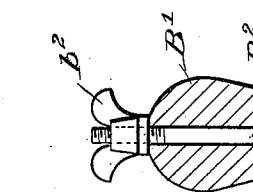
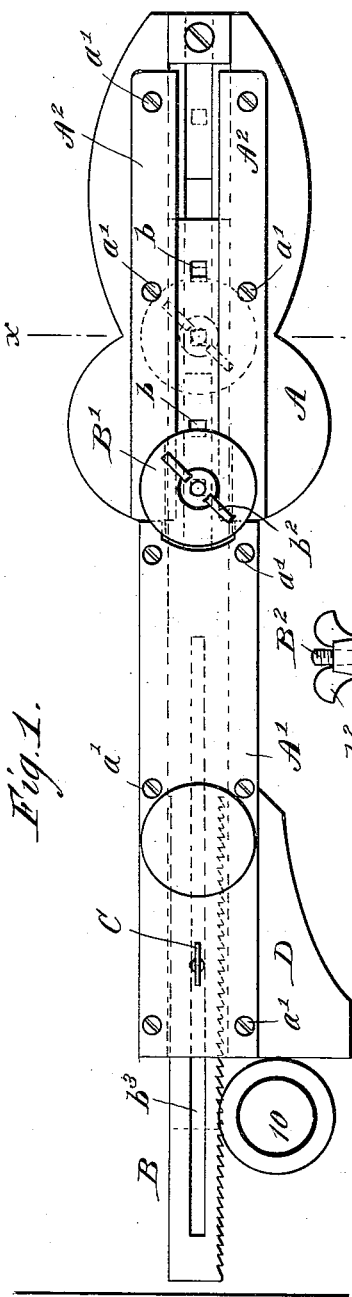
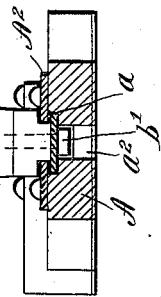
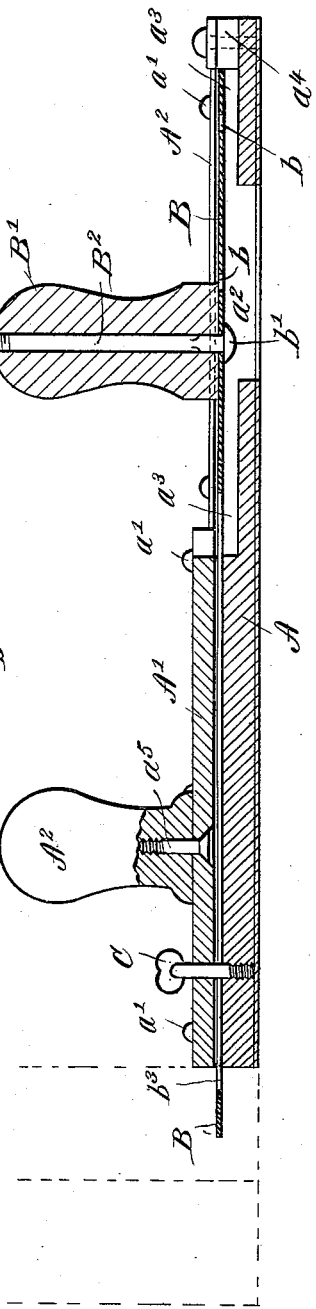
WITNESSES:
Donn Twitchell.
C. Sedgwick
INVENTOR:
R. McAlpine
BY C. McAlpine
Munn & Co
ATTORNEYS.

UNITED STATES PATENT OFFICE.

ROBERT McALPINE AND CHARLES McALPINE, OF TRENTON, NEW JERSEY.

SAW FOR PLUMBERS' USE.

SPECIFICATION forming part of Letters Patent No. 407,941, dated July 30, 1889.

Application filed April 29, 1889. Serial No. 308,935. (No model.)

*To all whom it may concern:*

Be it known that we, ROBERT McALPINE and CHARLES McALPINE, both of Trenton, in the county of Mercer and State of New Jersey, have invented a new and Improved Saw for Plumbers' Use, of which the following is a full, clear, and exact description.

The object of the invention is to provide a saw for the use of plumbers, whereby lead-pipe connections may be severed quickly, safely, and accurately within the narrow compass usually available for operation of the saw.

The invention consists in the novel construction and combination of parts, as hereinafter described, and defined in the claims.

Reference is to be had to the accompanying drawings, forming a part of this specification, in which similar letters of reference indicate corresponding parts in all the figures.

Figure 1 is a plan or top view of a saw constructed in accordance with our invention. Fig. 2 is a longitudinal vertical section, and Fig. 3 is a transverse vertical section on the line $x$ $x$ in Fig. 1.

That the purpose and advantages of the invention may be better understood, it is explained that the ordinary bath-tub has its waste-pipe only one and one-half inch (more or less) from the back, which leaves a very limited space within which to work in severing the pipe one-half inch (more or less) from the bottom of the tub; also, the wash-trays of laundries have the waste-pipes but from one and one-half to two inches from the back, the room for working being even more limited than in the case of a bath-tub. With the ordinary compass-saw or a "chipping" knife there is danger of damaging the tubs or trays, owing to the narrow compass available for manipulating the tool in severing the waste-pipe for floating in or soldering in bath-plugs, &c.

Our invention is therefore specially designed to enable the pipe to be expeditiously severed in instances like the above and similar instances involving a limited space for working.

The stock or frame A of the saw is formed with a longitudinal groove $a$, in which is seated the reciprocating saw-blade B.

At the front end the blade B is held against vertical displacement by means of the cleat A', that is held to the stock A by the screws $a'$ or otherwise, and at the rear the blade is held against displacement by the metallic plates $A^2$ $A^2$, that are also secured to the stock by screws $a'$ in a manner to project partially over the said blade, leaving a space between them. In the space so formed between the plates $A^2$ $A^2$ moves the handle B', by which the blade B is reciprocated.

The handle B' is adjustably secured to the blade as follows: The blade is formed with a series of holes $b$—three in the present instance—through any one of which and into and through the handle B' is passed upwardly from the bottom of the stock a spindle $B^2$, that is formed with a head $b'$ on its bottom end, which head comes to a bearing against the under side of the blade. The upper threaded end of the spindle $B^2$ receives a wing-nut $b^2$ or other suitable locking device for tightening the handle on the saw-blade. The stock A is formed with a vertical slot $a^2$ at the rear for enabling the spindle $B^2$ to be shifted in adjusting the handle B', and a longitudinal groove $a^3$ is formed in the stock, intersecting the vertical slot $a^2$, in which groove $a^3$ the head $b'$ of spindle $B^2$ moves when the saw is reciprocated. Thus the said head $b'$, by striking the forward end wall of the groove $a^3$, acts as a stop for limiting the forward movement of the blade, the backward movement of the blade being limited by the block $a^4$, secured to the extreme rear end of the stock A in the path of the blade.

The cleat A' is provided with a suitable handle $A^2$, which is secured thereto by a screw $a^5$, inserted from the under side of the cleat, its head lying flush with the latter.

The blade B is preferably formed with a longitudinal slot $b^3$, through which is passed the shank of a thumb-screw C, which thus acts to partially guide the blade in its movements. A side extension D at the front end of stock A serves to rest and steady the saw against a pipe, as 10. As the head of the spindle $B^2$ acts to limit the forward movement of the blade, it is evident that the nearer the handle is to the rear of the blade the greater distance may the free end of the blade be projected beyond the stock A.

It is evident that the blade B may be reversed—that is, arranged with its toothed edge to the right or left—which further increases its efficiency by enabling the workman to take advantage of the greater working-space that may be found at either side of the pipe.

It will be understood that the construction shown and described is but one embodiment of the generic invention, the details of which may be varied.

Having thus described our invention, what we claim as new, and desire to secure by Letters Patent, is—

1. The combination, in a saw, of a stock or frame and the reciprocating saw-blade held to said stock and arranged to be projected by its free end beyond the end of the same, substantially as described.

2. The combination, with the stock or frame, of the reciprocating saw-blade held thereto and an adjustable stop for regulating the extent of movement of the blade, substantially as described.

3. The combination, with the stock or frame provided with a handle, of a reciprocating blade held thereto and also provided with a handle, substantially as described.

4. The combination, with the stock formed with a vertical slot, of a reciprocating saw-blade having a series of apertures therein, and a detachable handle formed with a vertical aperture, and a spindle fitting the aperture of the handle for securing the latter to the blade at any of the apertures therein, the vertical slot of the stock enabling the spindle to be withdrawn from the said handle to change its position, substantially as described.

ROBERT McALPINE.
CHARLES McALPINE.

Witnesses:
ALBERT W. RISDON,
FRANK HAINES.